3,042,699
Patented July 3, 1962

3,042,699
ORGANIC PHOSPHORUS COMPOUNDS
Gail H. Birum, Dayton, Ohio, assignor to Monsanto Chemical Company, St. Louis, Mo., a corporation of Delaware
No Drawing. Filed Oct. 5, 1959, Ser. No. 844,206
17 Claims. (Cl. 260—461)

The present invention relates to organic compounds of phosphorus.

An object of this invention is to provide new and useful compounds containing pentavalent phosphorus atoms.

A more specific object of this invention is to provide new cyclic phosphate and phosphorothioate compounds containing phosphinylhydrocarbyloxy radicals.

Other objects of this invention will appear from the description hereinafter.

In copending application, S.N. 780,221, filed December 15, 1958, now abandoned, there are disclosed and claimed compounds of general formula:

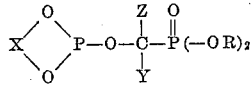

wherein X is selected from the class consisting of bivalent alkylene and arylene radicals having from 2 to 6 carbon atoms and said radicals containing halogen as a substituent; R is selected from the class consisting of alkyl and haloalkyl radicals having from 1 to 12 carbon atoms; Y is selected from the class consisting of hydrogen and the radicals; alkyl of from 1 to 17 carbon atoms, alicyclic hydrocarbons which are free from α,β-unsaturation and have from 3 to 8 carbon atoms, benzenoid hydrocarbons which are free from aliphatic unsaturation and have from 6 to 18 carbon atoms, furyl, thienyl, and the said radicals carrying a substituent selected from the class consisting of halogen, —CHO, -alkyl, —S—S—, —CN, (alkyl)$_2$N—, —COOalkyl, —Salkyl, —Oalkyl where alkyl denotes an alkyl radical of from 1 to 5 carbon atoms; Z is selected from class consisting of hydrogen and alkyl radicals of 1 to 3 carbon atoms; and Y and Z together stand for an alicyclic ring selected from the class consisting of cycloalkylene and cycloalkenylene radicals having from 5 to 6 carbon atoms in the ring, a total of from 6 to 10 carbon atoms, and being free of α,β-unsaturation, and a method of making them. Those compounds can be described as cyclic phosphite esters having a phosphinylhydrocarbyloxy radical attached thereto. They can also be classified as phosphite-phosphonates, which description illustrates the types of phosphorus linkages which exist in the compounds.

We have now discovered new cyclic phosphate and phosphorothioate compounds of the general formula

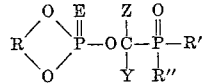

where R is a bivalent hydrocarbylene radical selected from the group consisting of lower alkylene radicals having from 2 to 3 carbon atoms in the ring and a total of from 2 to 10 carbon atoms and halogen substitution products thereof, arylene radicals of from 6 to 10 carbon atoms wherein the carbon-oxygen bonds are on the adjacent carbon atoms of the aryl ring; Y is selected from the group consisting of hydrogen, and the radicals: alkyl and alkenyl radicals of from 1 to 17 carbon atoms, alicyclic hydrocarbons which have have from 3 to 10 carbon atoms, benzenoid hydrocarbons which have from 6 to 18 carbon atoms, furyl and thienyl, and said Y radicals carrying a substituent selected from the group consisting of halogen, -alkyl, —CN, —COOalkyl, —Salkyl, and —Oalkyl where alkyl denotes an alkyl radical of from 1 to 5 carbon atoms; Z is selected from the group consisting of hydrogen, and alkyl radicals of from 1 to 3 carbon atoms; and Y and Z taken together complete an alicyclic ring selected from the class consisting of cycloalkylene and cycloalkenylene radicals having from 5 to 6 carbon atoms in the ring and a total of from 5 to 10 carbon atoms; R' and R" are each selected from the group consisting of hydrocarbyl, hydrocarbyloxy, halohydrocarbyl, and halohydrocarbyloxy radicals which are free from aliphatic unsaturation and have from 1 to 12 carbon atoms; and E is selected from the group consisting of oxygen and sulfur.

The compounds of this invention can be characterized as cyclic phosphate esters having phosphinylhydrocarbyloxy radicals attached to the phosphorus atom thereof. They can also be classified as phosphate-phosphonates, phosphate-phosphinates, or phosphate-phosphine oxide derivatives or their phosphorothioate counterparts, depending upon the types of phosphorus linkages which exist in the compounds. When R is an alkylene radical having from 2 to 3 carbons, possibly having halogen and alkyl substituents thereon, they are 2-oxo- or 2-thio-1,3,2-dioxaphospholanes, or 2-oxo- or 2-thio-1,3,2-dioxaphosphorinanes. However, when R denotes an arylene radical such as that derived from pyrocatechol, the compounds are pyrocatechol esters of phosphinylhydrocarbyloxy phosphates.

The compounds of this invention can be prepared by oxidizing or thionating a cyclic phosphite ester having a phosphinylhydrocarbyloxy radical attached thereto. Thus, when a cyclic phosphite-phosphonate compound of the type $$R\underset{O}{\overset{O}{\diagdown}}P-O\underset{Y}{\overset{Z}{\underset{|}{C}}}-\overset{O}{\underset{||}{P}}\underset{Ohydro}{\overset{Ohydro}{\diagup}}$$

wherein R, Y, and Z are as defined above, and each hydro denotes a hydrocarbyl or halohydrocarbyl radical free from aliphatic unsaturation which contains 1 to 12 carbon atoms, is treated with an oxidizing agent, a cyclic phosphate-phosphonate compound is produced, and when sulfur is used a phosphorothioatephosphonate is produced.

Examples which illustrate the reactants of this type and the products obtained when an oxidizing agent is used are:

2-[1-(dimethoxyphosphinyl)ethoxy] - 1,3,2 - dioxaphospholane to obtain 2-[1-(dimethoxyphosphinyl)ethoxy]-2-oxo-1,3,2-dioxaphospholane, 2-[1-(hexyloxyphenoxyphosphinyl)butoxy] - 1,3,2 - dioxaphosphorinane to obtain 2-[1-(hexyloxyphenoxyphosphinyl)butoxy]-2-oxo-1,3,2-dioxaphosphorinane, 2-{α[bis(4-chlorophenoxy)phosphinyl] - 4 - ethoxybenzyloxy}-1,3,2-dioxaphospholane to obtain 2-{α-[bis(4-chlorophenoxy)phosphinyl] - 4 - ethoxybenzyloxy}-2-oxo-1,3,2-dioxaphospholane, and 2-[1-(didodecyloxyphosphinyl) - 3 - hexenyloxy] - 1,3,2-dioxaphosphorinane to obtain 2-[1-(didodecyloxyphosphinyl) - 3 - hexenyloxy] - 2 - oxa - 1,3,2 - dioxaphosphorinane.

When sulfur is reacted with a phosphite-phosphonate of the above general type, phosphorothioate-phosphonate compounds are produced. Examples of reactants that may be used and the resulting products obtained when sulfur is used are:

2 - {1 - [bis(2 - chloropropoxy)phosphinyl] - 3 - chloropropoxy}-1,3,2-dioxaphosphorinane to obtain 2-{1-[bis(2 - chloropropoxy)phosphinyl] - 3 - chloropropoxy}-2-thio-1,3,2-phosphorinane, 2 - {α - [bis(p - tolyloxy)phosphinyl] - 3 - cyanobenzyl-oxy}-1,3,2-dioxaphospholane to obtain 2-{α-[bis(p-tolyloxy)phosphinyl] - 3 - cyanobenzyloxy} - 2 - thio-1,3,2-dioxaphospholane, and 2 - {1 - [bis(3,3 - dichloropropoxy)phospinyl] - 6 - cyanohexyloxy}-1,3,2-dioxaphosphorinane to obtain 2-{1-[bis(3,3 - dichloropropoxy) - phosphinyl] - 6 - cyanohexyloxy}-2-thio-1,3,2-dioxaphosphorinane.

When a phosphite-phospinate compound of the type

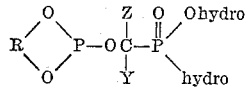

wherein R, Y, Z, and hydro are as above defined, is reacted with an oxidizing agent, phosphate-phosphinate compounds are prepared. Examples which illustrate the type of reactants that can be used and the products obtained when an oxidizing agent is used are:

2 - {1 - [(2 - chloroethoxy)ethylphosphinyl] - 8 - ethylthiooctyloxy}-1,3,2-dioxaphosphorinane to obtain 2-{1-[(2 - chloroethoxy) - ethylphosphinyl] - 8 - ethylthiooctyloxy}-2-oxo-1,3,2-dioxaphosphorinane, 2 - {α - [(octyloxy)(α - naphthyl)phosphinyl] - 4 - carbethoxybutoxy}-1,3,2-dioxaphospholane to obtain 2-{α-[(octyloxy)(α - naphthyl) - phosphinyl] - 4 - carbethoxybutoxy}-2-oxo-1,3,2-dioxaphospholane, and 2 - {1 - [(p - tolyloxy)(phenyl)phosphinyl] - 6 - ethylthiohexyloxy}-1,3,2-dioxaphosphorinane to obtain 2-{1-[(p - tolyloxy)(phenyl)phosphinyl] - 6 - ethylthiohexyloxy}-2-oxo-1,3,2-dioxaphosphorinane.

When a phosphite-phospinate compound of the above type is treated with sulfur, phosphorothioate-phosphinate type compounds are prepared. A few examples are:

2 - [1 - (dodecyloxydodecylphosphinyl) - 4 - propylbenzyloxy]-1,3,2-dioxaphospholane to obtain 2-[1-(dodecyloxydodecylphosphinyl) - 4 - propylbenzyloxy] - 2 - thio-1,3,2-dioxaphospholane, Pyrocatechol ester of 2-{α-[(4-bromophenyl) butoxyphosphinyl]-4-methoxybenzyl} phosphite to obtain the pyrocatechol ester of 2-{α-[(4-bromophenyl) butoxyphosphinyl]-4-methoxybenzyl phosphorothioate, and 2 - [2 - (phenylphenoxyphosphinyl)propoxy] - 1,3,2 - dioxaphosphorinane to obtain 2-[2-(phenylphenoxyphosphinyl)propoxy]-2-thio-1,3,2-dioxaphosphorinane.

When a phosphite-phosphine oxide type compound of the formula

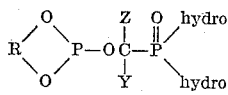

wherein R, Y, Z, and hydro are as defined above is treated with an oxidizing agent, phosphate-phosphine oxide derivatives are prepared. Examples of reactants that may be used and the products obtained are:

2 - [1 - (diethylphosphinyl)propoxy] - 1,3,2 - dioxaphosphorinane to obtain 2-[1-(diethylphosphinyl)propoxy]-2-oxo-1,3,2-dioxaphosphorinane, 2 - {α - [(propyl) - α - naphthylphosphinyl]furyloxy}-1,3,2-dioxaphospholane to obtain 2-{α-[(propyl)-α-naphthylphosphinyl] - furyloxy} - 2 - oxo - 1,3,2 - dioxaphospholane, and 2 - {2 - [bis(2 - naphthyl)phosphinyl]butoxy} - 1,3,2 - dioxaphosphorinane to obtain 2-{2-[bis(α-naphthyl)phosphinyl]butoxy}-2-oxo-1,3,2-dioxaphosphorinane.

When such phosphite-phosphine oxide derivatives are treated with sulfur, phosphorothioate-phosphine oxide derivatives are prepared. A few examples are:

2 - {α - [bis(2 - methylphenyl)phosphinyl]thienyloxy}-1,3,2-dioxaphosphorinane to obtain 2-{α-[bis(2-methylphenyl)phosphinyl]thienyloxy} - 2 - thio - 1,3,2 - dioxaphosphorinane, Pyrocatechol ester of 2-{1-[(propyl)phenylphosphinyl]-6-methoxyhexyl} phosphite to obtain the pyrocatechol ester of 2-{1-[(propyl)phenylphosphinyl]-6-methoxyhexyl phosphorothioate, and 2 - {1 - [bis(4 - methylnonyl)phosphinyl] - 4 - methylthiobutoxy}1,3,2-dioxaphospholane to obtain 2-{1-[bis(4 - methylnonyl)phosphinyl] - 4 - methylthiobutoxy}-2-thio-1,3,2-dioxaphospholane.

Also included within the scope of this invention are the cyclic phosphates and phosphorothioates of the above general formula which have halogen, haloalkyl, or alkyl substituents in the R group of the molecule. These compounds can be prepared by treating cyclic phosphite-phosphonates, phosphite-phosphinates, and phosphite-phosphine oxide compounds with an oxidizing agent to prepare the phosphates, or with sulfur, to prepare the phosphorothioates. Examples of the types of reactants that can be used and the products prepared thereby are:

2 - [1 - diethoxyphosphinyl) - 2 - chlorobenzyloxy] - 5-ethyl-5-methyl-1,3,2-dioxaphosphorinane to obtain 2-[1 - (diethoxyphosphinyl) - 2 - chlorobenzyloxy] - 5-ethyl - 5 - methyl - 2 - oxo - 1,3,2 - dioxaphosphorinane, when an oxidizing agent is used, 2 - {α - [(ethoxy)phenylphosphinyl] - p - methoxybenzyloxy}-4,4,6-trimethyl-1,3,2-dioxaphosphorinane to obtain 2-{α-[(ethoxy)phenylphosphinyl)-p-methoxybenzyloxy} - 4,4,6 - trimethyl - 2 - thio - 1,3,2 - dioxaphosphorinane, when sulfur is used, 3,4-dichloropyrocatechol ester of 1-[bis(p-tolyl)phosphinyl]-2-propenyl phosphite to obtain the 3,4-dichloropyrocatechol ester of 1-[bis(p-tolyl)phosphinyl]-2-propenyl phosphate, when an oxidizing agent is used, and 2 - {1 - [(4 - bromophenoxy)butoxyphosphinyl]cyclopentoxy}-4-chloromethyl-1,3,2-dioxaphospholane to obtain 2-{1-[(4-bromophenoxy)butoxyphosphinyl]cyclopentoxy} - 4 - chloromethyl - 2 - thio - 1,3,2 - dioxaphospholane, when sulfur is used.

We have found that a wide variety of oxidizing agents convert the trivalent phosphite phosphorus atom of the phosphite-phosphonate, phosphite-phosphinate, and phosphite-phosphine oxide derivatives to the pentavalent state and supply an oxygen atom thereto without disturbing the other groups attached thereto.

Some of these oxidizing agents which are preferred for use in making the compounds of this invention are the peroxycarboxylic acids, both aromatic and aliphatic, hydroperoxides, hydrogen peroxide, ozone, oxygen, nitrogen oxides such as nitrogen tetroxide, and air, although the use of air is not preferred. Although the more common inorganic oxidizing agents, such as $KMnO_4$, $CrO_3$, etc., would accomplish the oxidation, they are not desirable for reasons of expense, salt by-product complications, etc. To prepare the cyclic phosphorothioate-phosphonate, phosphorothioate-phosphinate, and phosphorothioate-phosphine oxide derivatives of this invention, elemental sulfur is preferably used. In either case, i.e., whether the cyclic phosphate of phosphorothioate products are being prepared, the cyclic phosphite-phosphonate, phosphite-phosphinate, or phosphite-phosphine oxide derivative is usually contacted with a stoichiometric quantity or slight excess of oxidizing agent or sulfur while heating the mixture, when necessary, to insure complete reaction. Any excess of oxidizing agent or sulfur can easily be recovered by known means, e.g. filtration, volatilization, extraction, etc.

Reaction of the cyclic phosphite-phosphonate, phosphite-phosphinite, or phosphite-phosphine oxide derivative and the oxidizing agent or sulfur can take place readily at room temperature. However, in the case of the highly active oxidizing agents it is often times preferred to cool the mixture, generally, to between —70° C. and 20° C., depending upon which reactants are combined, to control the rate of the resulting exothermic reaction. On the other hand, the reaction with sulfur is most practically accomplished by warming the cyclic phosphite-phosphonate, phosphite-phosphinate, or phosphite-phosphine oxide and sulfur mixture to, say, from 50° to 100° C. to initiate the reaction and then to a higher temperature of from 130° to 180° C. to insure completion of the reaction.

The oxidation or thionation of the cyclic phosphite-phosphonate, phosphite-phosphinate, and phosphite-phosphine oxide derivative starting materials is readily conducted in the absence of an inert diluent, solvent, or catalyst. However, diluents, or solvents, and catalysts may be employed. The use of diluents or solvents may be particularly advantageous when working with the highly active oxidizing agents or the more viscous phosphite-phosphonate, phosphite-phosphinate, and phosphite-phosphine oxide derivative. Such diluents may be e.g., benzene, toluene, dioxane, alkylene halides such as methylene chloride and methylene bromide, hexane, and mixtures thereof. Although no particular order of contacting the oxidizing agent or sulfur with the cyclic phosphite starting materials need be employed it is good practice to add the oxidizing agent or sulfur portionwise to the cyclic phosphite starting material to avoid unduly exothermic reactions and to avoid waste of reactants.

The phosphinylhydrocarbyloxy cyclic phosphates and phosphorothioates of this invention are stable usually high boiling materials which range from viscid liquids to waxy or crystalline solids. They are useful as plasticizers, and as functional fluids. They are also useful as biological toxicants in quantities ranging from 1 to 10 parts per million to 10,000 parts per million, depending upon the organism. They can be used as lead scavengers in leaded gasoline in quantities of from 0.5 to 10.0 mole per mole of lead in the gasoline. They are useful as flame-proofing agents in quantities of from 0.5% to 10% by weight, depending upon the material to which they are added, in many polymeric materials, such as urea-formaldehyde, phenol-formaldehyde, epoxy resins, and other oxygen containing resins, in polyester type compositions such as polyterephthalates, polyacrylonitrile, and polyamide polymers and condensation products used to make fibers, in urethane, styrene, and other foam materials, and in rubber based emulsion type coatings.

Those of the presently prepared compounds which are gasoline-soluble are particularly useful as stable preignition additives for leaded gasolines. The invention thus provides an improved fuel for spark ignition internal combustion engines which consists essentially of gasoline, an organo-lead antiknock, and a phosphinyl hydrocarbyloxy cyclic phosphate or phosphorothioate product of this invention, said product being present in said fuel in a quantity sufficient to suppress preignition of the fuel.

Preignition is the ignition of the combustible mixture of air and fuel prior to firing by the spark plug. This occurs when deposits of readily glowing material build up in the combustion chamber. When the fuel is a gasoline containing an organo-lead antiknock together with a halohydrocarbon scavenger, such readily glowing deposits comprise carbon in a mixture with lead halides; the latter acting to reduce the normal ignition temperature of carbon. Since reduction of the ignition temperature tends to increase with increasing concentration of the organo-lead antiknock, preignition is a problem which becomes particularly troublesome as use of high compression engines become more prevalent. The deposits of carbon and lead salt retain sufficient heat from the previous firing cycle in enough quantity to permit them to glow, and if the glowing period (which depends upon ease of ignition, and hence the lead content of the deposit) is long enough, the fuel is fired in the next cycle before it can be fired by the spark plug. The erratic firing which thus results is demonstrated by a "wild ping" or a dull, thudding knock. It is generally accompanied by increased detonation, spark plug fouling, and reduction of exhaust valve life.

It has now been found that preignition and the various difficulties consequent thereto can be substantially suppressed or entirely eliminated by incorporating the gasoline-soluble pentavalent phosphinylhydrocarbyloxy cyclic phosphate or phosphorothioate into the leaded gasoline in a preignition-inhibiting quantity. Such a quantity of course, will depend upon the content of the organolead compound and halohydrocarbon scavenger in the fuel. Lead gasolines usually contain an antiknocking quantity of an organolead compound such as tetraethyllead, tetramethyllead, dimethyldiethyllead, and tetraphenyllead and substantially the amount of hydrocarbon halide scavenger, say, ethylene dibromide, ethylene dichloride, acetylene tetrabromide, or mono- or polyhalopropane, butane, or pentane, or polyhaloalkyl benzene, which is calculated to react with the organolead compound to give a lead halide, e.g., lead bromide when the organolead compound is tetraethyllead, and the halohydrocarbon is ethylene dibromide. The quantity of the phosphinylhydrocarbyloxy cyclic phosphate or phosphorothioate which will suppress preignition of the leaded hydrocarbon fuel will depend upon the quantity of lead present in the fuel.

The invention is further illustrated by, but not limited to, the following examples.

*Example 1*

A 42.6 g. (0.159 mole) portion of 2-[1-diethoxyphosphinyl)propoxy] - 1,3,2 - dioxaphosphorinane was mixed with 4.0 g. (0.125 mole) of sulfur at room temperature and stirred. An exothermic reaction resulted and the temperature of the mixture increased gradually to 55° C. before it receded. The mixture was then heated to 120° C. at which temperature all the sulfur had reacted and the solution was clear and colorless. Then 1.0 g. more of sulfur was added and the mixture was heated to 120–140° C. for twenty minutes. At the end of this time the solution was yellow so 4.5 g. of starting 2-[1-(diethoxyphosphinyl)propoxy] - 1,3,2 - dioxaphosphorinane was added, and on heating, the solution cleared. Another 0.3 g. of sulfur was added and the mixture was heated to 155° C. There was thus obtained 51.7 g. of clear, almost colorless 2-[1-(diethoxyphosphinyl)propoxy]-2-thio-1,3,2-dioxaphosphorinane,

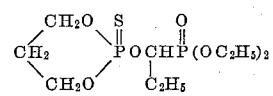

Nuclear magnetic resonance chemical shifts were found at −65 p.p.m. and at −20 p.p.m. (relative to $H_3PO_4$) for the two types of phosphorus in this compound. The −65 p.p.m. shift is characteristic of the six-membered ring thiophosphate type, and −20 p.p.m. is characteristic of the phosphonate structure.

*Example 2*

A 62.7 g. (0.191 mole) portion of 2-[1-(diethoxyphosphinyl)ethoxy]-1,3,2-dioxaphospholane was mixed with 4.5 g. of sulfur at room temperature, and the resulting mixture was stirred and warmed to 115° C. at which temperature the solution became clear. More sulfur was added in small portions until a total of 6.1 g. (0.191 mole) had been added. The mixture was finally heated at 120–130° C. while stirring for 40 minutes to insure complete reaction. There was thus obtained 68.1 g. of 2-[1-diethoxyphosphinyl)ethoxy]-2-thio-1,3,2-dioxaphospholane,

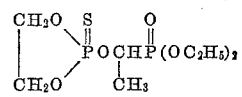

Nuclear magnetic resonance chemical shifts for phosphorus were found at −85 p.p.m. and at −19 p.p.m. (relative to $H_3PO_4$) for the above product. The −85 p.p.m. shift is characteristic of the five-membered ring thiophosphate type, and the —19 p.p.m. shift is characteristic of the phosphonate type.

Example 3

A 66.4 g. (0.2 mole) portion of 2-[1-(diethoxyphosphinyl)-3-methylthiopropoxy] - 1,3,2 - dioxaphospholane was stirred as 5.9 g. (0.184 mole) of sulfur was added and the mixture was warmed to 120° C. Since a small amount of unreacted sulfur was present 10.1 g. more of the starting phospholane compound was added and the mixture stirred and heated to 120° C. to give 72.1 g. of light yellow liquid product, $n_D^{25}$ 1.5058, which was substantially 2-[1-(diethoxyphosphinyl)3-methylthiopropoxy]-2-thio-1,3,2-dioxaphospholane,

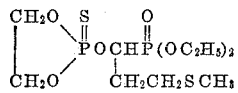

Nuclear magnetic resonance measurements for phosphorus in the above compound gave shifts at —85 p.p.m. and at —20 p.p.m. (relative to $H_3PO_4$). The —85 p.p.m. chemical shift is characteristic of thiophosphates of the above type, and the —20 p.p.m. chemical shift is characteristic of phosphonates of this type.

Example 4

A 71.8 g. (0.187 mole) portion of 2-[1-(diethoxyphosphinyl)ethoxy]-4-chloromethyl - 1,3,2 - dioxaphospholane was mixed with 5 g. of sulfur and then warmed gradually to 125° C. while stirring. The mixture became clear and colorless so more sulfur was added in 0.5 g. portions and the mixture heated to 120–144° C. over a period of 50 minutes until a total of 6.0 g. of sulfur had been added. There was thus obtained 77.3 g. (99.3% yield) of viscous, colorless 2-[1-(diethoxyphosphinyl)ethoxy]-2-thio-4-chloromethyl-1,3,2-dioxaphospholane,

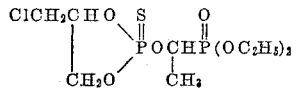

Example 5

A 53.6 g. (0.183 mole) portion of the pyrocatechol ester of [1-(dimethoxyphosphinyl)ethoxy] phosphorus acid was mixed with 4.7 g. of sulfur and the mixture was stirred for ten minutes and then heated to 140° C. and maintained at 135–140° C. for 1.1 hours while stirring. In this manner there was obtained a phosphorothioate product having the formula,

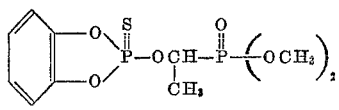

Example 6

A 54.2 g. (0.189 mole) portion of 2-[2-(diethoxyphosphinyl)propoxy]-1,3,2-dioxaphospholane was mixed with 5.3 g. of sulfur and stirred at room temperature for ten minutes during which time the temperature of the reaction mixture increased to 30° C., indicating a slight exothermic reaction. The mixture was then warmed while stirring, and when the temperature reached 120° C. the solution was clear and colorless. So small amounts of sulfur were added and the mixture warmed until reaction seemed complete after 10 minutes at 140° C. In this manner there was obtained a phosphorothioate having the formula,

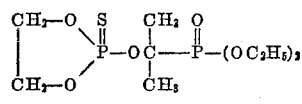

Example 7

A 68.4 g. (0.166 mole) portion of 2-[α-(diethoxyphosphinyl)-2-chlorobenzyloxy]-5,5-dimethyl - 1,3,2 - dioxaphosphorinane was mixed with 4.3 g. of sulfur, stirred for 15 minutes, and then gradually heated to 128° C. and maintained there for five minutes. When all the sulfur had reacted, the solution was successively cooled to 100° C., treated with another 0.5 g. of sulfur, and heated gradually to 140° C. until reaction was complete. There was thus obtained 73.6 g. of 2-[α-(diethoxyphosphinyl)-2'-chlorobenzyloxy] - 2 - thio-5,5-dimethyl-1,3,2-dioxaphosphorinane,

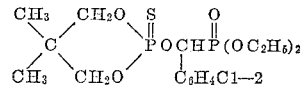

Example 8

A mixture consisting of 41.9 g. (0.108 mole) of 2-[1-(phenylethoxyphosphinyl)-2'-ethylhexyloxy] - 1,3,2 - dioxaphospholane and 2.8 g. of sulfur was stirred for 15 minutes and then heated to 130° C. When all the sulfur had reacted, the mixture was cooled, treated with more sulfur, and heated as in the prior examples until as much sulfur as possible had reacted. There was thus obtained 45 g. (99.7% yield) of clear, almost colorless 2-[1-(phenylethoxyphosphinyl)-2'-ethylhexyloxy]-2-thio-1,3,2-dioxaphospholane,

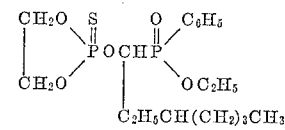

Example 9

A 41.0 g. (0.107 mole) portion of 2-{1-[bis(2-chloropropoxy)phosphinyl]propoxy}-1,3,2 - dioxaphospholane was mixed with 2.8 g. of sulfur, stirred for 15 minutes, and heated to 140° C. The solution was cooled, treated with 0.2 g. more sulfur, and heated again to 130° C. and maintained at that temperature for 15 minutes. There was thus obtained a 100% yield of crude 2-{1-[bis-(2-chloropropoxy)phosphinyl]propoxy}-2-thio - 1,3,2-dioxaphospholane,

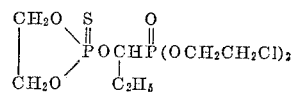

Example 10

A 19.5 g. (0.072 mole) portion of 2-[1-(dimethoxyphosphinyl)-2-methyl-2-propenyloxy] - 1,3,2 - dioxaphospholane was mixed with 1.8 g. of sulfur, stirred for 15 minutes, and heated gradually to 125° C. The solution was cooled to 120° C., treated with 0.3 g. more sulfur, and heated to 135° C. to insure complete reaction. In this way there was obtained 21.5 g. of clear, colorless 2-[1-(dimethoxyphosphinyl) - 2' - methyl - 2' - propenyloxy]-2-thio-1,3,2-dioxaphospholane,

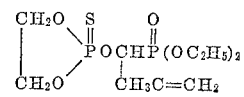

Example 11

A 32.3 g. (0.09 mole) portion of 2-[2'-(diethoxyphosphinyl)-3'-carbethoxypropoxy] - 1,3,2-dioxaphospholane was mixed with 2.3 g. of sulfur and heated to 130° C. Another 0.3 g. of sulfur was added and heating continued to 142° C. to insure complete reaction. There was thus obtained 34.7 g. of 2-[2'-(diethoxyphosphinyl)-3'-carbethoxypropoxy]-2-thio-1,3,2-dioxaphospholane.

Example 12

A reaction flask, equipped with a gas inlet stirrer, a Dry Ice condenser, and a thermometer was charged with 42.4 g. (0.148 mole) of 2-[2'-(diethoxyphosphinyl)propoxy]-1,3,2-dioxaphospholane and 30 ml. of methylene chloride. This mixture was cooled to —20° C. and an oxygen-ozone stream was passed into the flask. The rate of $O_3$ output was 38 mg./liter of oxygen-ozone mixture. After one hour and ten minutes ozone was no longer being absorbed as indicated by an ozone meter in the apparatus system and blue color in the reaction flask. The mixture was warmed to room temperature, purged with nitrogen to remove ozone, and transferred to a distillation flask to remove the methylene chloride. There was thus obtained 2[2' - (diethoxyphosphinyl)propoxy] - 2 - oxo - 1,3,2 - dioxaphospholane,

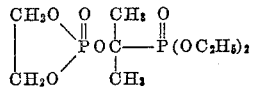

*Example 13*

This example illustrates the utility of the presently described compounds as preignition additives for leaded gasolines.

Since it has been established that there is a close relationship between the quantity of a material required to suppress glowing and the effectiveness of the same material for reducing preignition of a leaded fuel in gasoline engines, testing of the presently prepared phosphorus compounds was conducted by a glow test method wherein the following procedure was employed.

Test blends were prepared by blending (1) 5 ml. of a fuel consisting of a high-boiling (380–420° F.) hydrocarbon fraction containing approximately 136 mg. of lead based on the quantity of commercial tetraethyllead-halohydrocarbon additive (hereinafter referred to as TEL) which had been incorporated therein and 1 ml. of an SAE 30 grade lubricating oil with (2) graduated, precisely weighed quantities of one of the phosphorus compounds to be tested, said quantities being in the range of 0.01 to 2.0 times the quantity of lead present. Two ml. of the test blend was then dropped at a constant rate (1.5±0.1 ml./15 minutes) during a 15–17 minute period, into a reagent grade decolorizing carbon contained in a crucible maintained in a furnace at a temperature which was high enough to keep the bottom of the crucible at about 1000° F. By using test blends containing progressively lower quantities of the test compound, there was determined the minimum concentration of the test compound at which no glowing of the carbon was evidenced either during the dropping period or after all of the test sample had been added. Under these conditions, a "control" sample, i.e., one which contained all of the constituents of the test blend except the phosphorus compound caused the carbon to glow throughout addition thereof and after addition had been completed. Tri-cresyl phosphate, TCP, a commercial additive was tested according to this method. No glowing was observed when there was present in the test blend 0.0492 g. of TCP per 5 ml. of said fuel blend. On the other hand, no glowing was observed when there was present in the test blend 0.0237 g. of 2-[1-(dibutoxyphosphinyl)ethoxy]-2-thio-1,3,2-dioxaphospholane, which had been prepared as described herein.

Instead of the phosphinylhydrocarbyloxy thiophosphorolane products, there may be used for the purpose of effectively inhibiting preignition of leaded fuels, any of the gasoline soluble trivalent phosphorus-free products described above. While as will be obvious to those skilled in the art, the compound to be useful must be present in the gasoline in soluble form, it will also be realized that since the additive is employed in only very low concentrations, gasoline solubility at the presently useful concentrations is possessed by the great preponderance of the presently prepared compounds. Whether the trivalent phosphorus-free product is soluble in the gasoline at the effective concentration can be readily ascertained by routine experimentation.

Inasmuch as the crude reaction mixture obtained by the method used comprises an aliphatic halohydrocarbon as byproduct, the latter obviously can serve conveniently as the lead scavenger in leaded gasoline fuels containing the presently provided phosphinylhydrocarbyloxy cyclic phosphates and phosphorothioates.

Leaded gasolines containing the presently prepared compounds are compatible with other additives customarily used in the art, e.g., rust inhibitors, stabilizers and antioxidants, dyes, etc. The phosphinylhydrocarbyloxy cyclic phosphates and phosphorothioates of this invention may be employed in different proportions than specifically shown and with such other additives and adjuvants.

I claim:
1. Compounds of the formula

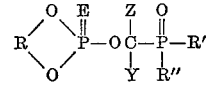

where R is a bivalent hydrocarbylene radical selected from the group consisting of lower alkylene radicals having from 2 to 3 carbon atoms in the ring, and a total of from 2 to 10 carbon atoms, halogen, and alkyl substitution products thereof, arylene radicals having from 6 to 10 carbon atoms wherein the carbon-oxygen bonds are on adjacent carbon atoms of the aryl ring; E is selected from the group consisting of sulfur and oxygen; Y is selected from the group consisting of hydrogen, and the radicals: alkyl and alkenyl radicals of from 1 to 17 carbon atoms, alicyclic hydrocarbyl radicals which have from 3 to 10 carbon atoms, benzenoid hydrocarbons which have from 6 to 18 carbon atoms, furyl, thienyl, and said Y radicals carrying a substituent selected from the group consisting of —CN, halogen, -alkyl, —COOalkyl, —Oalkyl, and —Salkyl where alkyl denotes an alkyl radical having from 1 to 5 carbon atoms; Z is selected from the group consisting of hydrogen and alkyl radicals of from 1 to 3 carbon atoms; and Y and Z taken together complete an alicyclic ring selected from the group consisting of cycloalkylene and cycloalkenylene radicals having from 5 to 6 carbon atoms in the ring and a total of from 5 to 10 carbon atoms; and R' and R" are each selected from the group consisting of hydrocarbyl, hydrocarbyloxy, halohydrocarbyl, and halohydrocarbyloxy radicals which are free from aliphatic unsaturation have from 1 to 12 carbon atoms.

2. Compounds according to claim 1 wherein R is a bivalent alkylene radical having from 2 to 3 carbon atoms in the ring and a total of from 2 to 10 carbon atoms, R' and R" are each a hydrocarbyloxy radical having from 1 to 12 carbon atoms, and E is oxygen.

3. Compounds according to claim 1 wherein R is a bivalent alkylene radical having from 2 to 3 carbon atoms in the ring and a total of from 2 to 10 carbon atoms, R' and R" are each a hydrocarbyl radical having from 1 to 12 carbon atoms, and E is sulfur.

4. Compounds according to claim 2 wherein R is a bivalent alkylene radical having as a substituent thereon a haloalkyl radical of from 1 to 5 carbon atoms.

5. Compounds according to claim 4 wherein R is a bivalent alkylene radical having as a substituent thereon a haloalkyl radical of from 1 to 5 carbon atoms.

6. Compounds according to claim 1 wherein R is an arylene radical having from 6 to 10 carbon atoms wherein the carbon-oxygen bonds are on adjacent carbon atoms of the aryl ring, Y is an alkyl radical of from 1 to 17 carbon atoms, Z is hydrogen, R' and R" are each hydrocarbyloxy groups, and E is selected from the group consisting of oxygen and sulfur.

7. 2-[1-(diethoxyphosphinyl)propoxy] - 2 - thio-1,3,2-dioxaphosphorinane.

8. 2-[1-(diethoxyphosphinyl)ethoxy] - 2 - thio-1,3,2-dioxaphospholane.

9. 2-[1-(diethoxyphosphinyl)ethoxy] - 2-thio-4-chloromethyl-1,3,2-dioxaphospholane.

10. Pyrocatechol ester of 1 - (dimethoxyphosphinyl)-ethoxy-thiophosphoric acid.

11. 2-[1-(diethoxyphosphinyl) - 3-methylthiopropoxy]-2-thio-1,3,2-dioxaphospholane.

12. 2-[2-(diethoxyphosphinyl)propoxy] - 2 - oxo-1,3,2-dioxaphospholane.

13. 2-[α-(diethoxyphosphinyl - 2 - chlorobenzyloxy]-2-thio-5,5-dimethyl-1,3,2-dioxaphosphorinane.

14. 2-[1-(phenylethoxyphosphinyl) - 2-ethylhexyloxy]-2-thio-1,3,2-dioxaphospholane.

15. 2-{1-[bis(2 - chloropropoxy)phosphinyl]propoxy}-2-thio-1,3,2-dioxaphospholane.

16. 2-[1 - (dimethoxyphosphinyl)-2-methyl-2-propenyloxy]-2-thio-1,3,2-dioxaphosphorinane.

17. 2-[2-(diethoxyphosphinyl) - 3-carbethoxypropoxy]-2-thio-1,3,2-dioxaphospholane.

References Cited in the file of this patent

UNITED STATES PATENTS

| | | |
|---|---|---|
| 2,847,443 | Hechenbleikner et al. | Aug. 12, 1958 |
| 2,848,475 | Schmidt | Aug. 19, 1958 |
| 2,889,212 | Yust et al. | June 2, 1959 |
| 2,890,947 | Annable et al. | June 16, 1959 |